(12) United States Patent
Leu

(10) Patent No.: US 6,791,956 B1
(45) Date of Patent: Sep. 14, 2004

(54) PERIPHERY DEVICE IN A WIRELESS NETWORK

(75) Inventor: Yuh-Rong Leu, Taipei (TW)

(73) Assignee: Institute for Information Industry, Taipei (TW)

(*) Notice: Subject to any disclaimer, the term of this patent is extended or adjusted under 35 U.S.C. 154(b) by 0 days.

(21) Appl. No.: 09/093,917

(22) Filed: Jun. 9, 1998

(30) Foreign Application Priority Data

Jun. 10, 1997 (TW) .................................... 86107997 A

(51) Int. Cl.[7] ................................................ H04Q 7/00
(52) U.S. Cl. ...................... 370/328; 370/401; 370/469
(58) Field of Search ................................ 370/328, 329, 370/310, 401, 218, 253, 349, 389, 392, 393, 471, 474, 465, 466, 467

(56) References Cited

U.S. PATENT DOCUMENTS 6,272,148 B1 * 8/2001 Takagi et al.
6,307,843 B1 * 10/2001 Okanoue
6,307,845 B1 * 10/2001 Hummelgren et al.

* cited by examiner

Primary Examiner—William Luther
(74) Attorney, Agent, or Firm—Dickinson Wright PLLC

(57) ABSTRACT

Apparatus for transmitting a signal from a periphery device to an Internet through a wireless local area network is disclosed herein, the apparatus including the following devices. Firstly, the converting device is used to transmit the signal between the local area network and the Internet using pack exchanging. Thus the frame is briefer than that used in the prior art. The frame is transmitted between the periphery device and the local area network with the frame of a brief structure. Second, the converting device is used as the bridge between the wireless local area network and the local area network. Third, the transceiving device is used to transmit the signal to the converting device through the wireless local area network. The transmitting periphery device is used to transmit a first output frame to the transceiving device. Thus the first output frame is sent to the converting device through the wireless local area network. Fourth, the receiving periphery device is used to receive the signal from the converting device.

21 Claims, 7 Drawing Sheets

PERIPHERY DEVICE IN A WIRELESS NETWORK

BACKGROUND OF THE INVENTION

1. Field of the Invention

This invention relates to a periphery device that can transmit data to the Internet without host (personal computer or notebook computer), especially relates to a wireless periphery device that can transmit data to the Internet with only local area network server.

2. Description of the Prior Art

If the Internet phone or the video conference is to be performed in a Local Area Network (LAN), as shown in FIG. 1A, the corresponding periphery devices such as camera 103, microphone 104, speaker 102, and monitor must be electrically coupled to the computer 100 (PC or notebook computer). Because the signal sent from the periphery device to the computer must be of an analog format. In order to digitize the signal mentioned above, the interface card proceed with the signal from the periphery device, and then the TCP/IP header is added to the digitized signal mentioned above, thus the frame is obtained. In the following step, the frame is transmitted using radio wave, and the structure of the frame 110 is shown in FIG. 1B.

The access point 105 (FIG. 1A) receives the frame from the computer 100 and converts the received frame to form the frame 120 shown in FIG. 1C. The frame 120 is sent to the Internet 109 through the gateway (not shown in FIG. 1A). Due to the IP address of the destination computer, the frame 120 is sent to the gateway 112 of the local area network 102. Then the access point 160 converts the received packet to the format of the frame 110, and transmitted the converted packet to the computer 128 using radio wave. The computer 128 unpacks the frame (converted packet) to acquire the data inside the frame to transfer to the periphery device. When the signal is transferred from computer 120 to computer 100, the signal can operate according to the principle mentioned above. So the periphery devices of the two computers can transmit data to each other. So the Internet phone and the video conference can be performed in the wireless local area network through Internet.

The structure of the frame that sent by computer 100 is shown in FIG. 1B as the frame 110, in which the data 19 is the data itself. The TCP (Transmission Control Protocol) layer header 117 is provided for the application program to ensure the data can arrive at the computer through the Internet. The IP (Internet Protocol) layer header 115 is used to determine the path that the datagram arrives at the destination computer, to define the Internet's address, and to implement unpacking as well as reforming of the frame. The MAC (Media Access Control) layer source address 113 is the address in the MAC layer of the source transmitting the frame. In this example shown in FIG. 1A, the MAC layer source address 113 is the hardware address of the network card of computer 100. The MAC layer destination address 111 is the hardware address of the computer's network card that receiving the frame in the next stage network. In this example shown in FIG. 1A, the MAC layer destination address 111 is the address of the gateway 106 in the MAC layer. The MAC layer access point destination address 11 is the hardware address of the access point's (105) wireless network card.

After the gateway 106 received the frame 110, the MAC layer source address 113 and the MAC layer destination address 111 are substituted by the MAC layer source address 123 and the MAC layer destination address 121 respectively. The MAC layer source address 123 stands for the address of the source transmitting the frame 120, i.e. the gateway 105's MAC layer address in this example shown in FIG. 1A. The MAC layer destination address 121 stands for the MAC layer destination address of the host receiving the frame 120 in the next stage. In this example shown in FIG. 1A, the MAC layer destination address 121 represents the gateway 124's MAC layer address, in which the gateway 124 is within the local area network 116. Gateway 124 transmits the frame 120 to the gateway in the next stage local area network, and the frame is changed in accordance with the forgoing principle, i.e. only the MAC layer address 121 and 123 are substituted.

After the gateway 128 in the local area network 118 has received a frame, the frame 130 shown in FIG. 1D is transmitted by gateway 128. In which the MAC layer destination address 131 is assigned as the MAC layer destination address of the gateway receiving the frame 130 in the next stage. In this example shown in FIG. 1A, the MAC layer destination address 131 is the address of the gateway 112 in the local area network 104. The MAC layer source address 133 represents the address of the source transmitting the frame 130. In this example shown in FIG. 1A, the MAC layer destination address 133 stands for the MAC layer destination address of the gateway 128 in the local area network 118. Gateway 128 transmits the frame 130 to the gateway in the next stage local area network, and the frame is changed in accordance with the forgoing principle, i.e. substitute the MAC layer address 131 and 133 only.

Because the access point 160 has built up a table for the computer communicating with the access point 160. Even the MAC layer destination address is not the MAC layer address of access point 160, the access point 160 will receive the frame that the MAC layer address is the computer's MAC layer address built in the forgoing table. In addition, a MAC layer access point address 151 is added to the frame mentioned above, and the frame being added with the MAC layer access point address 151 is shown as frame 150 in FIG. 1E.

As shown in FIG. 1E, the MAC layer access point address 151 is the MAC layer address of access point 160. The MAC layer destination address 152 stands for the computer 128's hardware address, and the MAC layer source address 153 is the MAC layer address of the gateway's network card that transmitting the frame 150. In this example shown in FIG. 1A, the MAC layer source address 163 is the hardware address of the gateway 112's network card. The IP (Internet Protocol) layer header 154 and the TCP (Transmission Control Protocol) layer header 156 are compared with the address of the computer 128, if they are matched, the frame will be received and processed by the computer 128.

The communicating model used by the prior are of the periphery device is the TCP/IP reference model, which includes five layers respectively defines the function used in the data communication. As shown in FIG. 1F, every layer has a name, and is not confined to one protocol, instead, the data communication function of every layer can be defined by arbitrary protocols. So a plurality of protocols can be included in a layer, every protocol provides one kind of suitable service for the layer. In transmitting the data from the resident application program to the equivalent remote application program, every layer of the TCP/IP reference models is involved. The higher level transmits the data to the bottom layer of the network depends on the lower layer, and the data is transferred downward through the stack of layers one by one, until the data passes the physical layer to the network. Vice versa, the data is transmitted to the remote application program by passing the data upward through the stack of layers one by one.

After the computer 100 has received the data, the five layers of the TCP/IP reference model can be used to illustrate the data transmission. The reference model 140 shown in FIG. 1F includes the application layer 147, which relates to the protocol of the user's access. The transmission control protocol layer 146 transmits the data between the application layer 147 and the Internet protocol layer 145 when the application program is activated by the user. The Internet protocol layer 145 is used to manage the connection on the network, and to separate the protocol of the upper layer from the trivial details of the bottom layer. The logic link layer 143 cooperates with the media access control layer 142 to maintain the reliability of the data transmission in the bottom physical network. The physical layer 141 defines the characteristic of the hardware that bearing the data transmission signal.

When the data 119 (FIG. 1B), is transmitted toward the bottom layer, the added header is adder by the five layers of the TCP model, in order to illustrate the principle, 11, 111, 113, 115, and 117 in FIG. 1B are illustrated for example. The TCP layer header 117 is added by the application layer 146 shown in FIG. 1F. The IP layer header 115 (FIG. 1B) is added by the Internet protocol layer 145 (FIG. 1F). The MAC layer address 113, 111 and 11 are added by the media access control layer 142 (FIG. 1F).

The five layers of the TCP model is used in the core of the operation system and the wireless network card of the computer 100. Whereas if the data acquired by the camera 103, the microphone 101 and the speaker 102 is to be sent to the Internet, the all of the periphery devices mentioned above must be connected to the computer 100 first, then the data can be transmitted to the Internet. So it is not convenient for the user to utilize the periphery devices in a wireless local area network.

SUMMARY OF THE INVENTION

In the periphery device in the prior art, the periphery device has to couple to the computer, then the signal acquired by the periphery device can be transmitted to the Internet through a LAN (Local Area Network). So the present invention proposes apparatus for transmitting a signal from a periphery device to an Internet through a wireless local area network, the apparatus includes the following devices.

Firstly, the converting device is used to transmit the signal between the local area network and the Internet using pack exchanging. Thus the frame is briefer than that used in the prior art. The frame is transmitted between the periphery device and the local area network with the frame of a brief structure. The converting device is used to process a MAC (Media Access Control) layer header of the signal and add a TCP/IP (Transmission Control Protocol/Internet protocol) layer header to the signal. Thus the signal can be transmitted to the Internet. The converting device processes the MAC layer header of the signal and remove the TCP/IP layer header from the signal, thus the signal is transmitted to the periphery device. The converting device includes a First MAC header processing device and a network card. The signal from the Internet to the periphery device is removed of the TCP/IP layer header, and firstly pass the network card then pass the First MAC header processing device. The signal from the periphery device to the Internet is added with the TCP/IP layer header, and firstly pass the First MAC header processing device then pass the network card. The First MAC header processing device is a virtual device driver (Vxd) that belongs to a level of a core of an operation system.

Second, the converting device is used as the bridge between the wireless local area network and the local area network. The transceiving device is a bridge of the wireless local area network and local area network coupling to the Internet.

Third, the transceiving device is used to transmit the signal to the converting device through the wireless local area network. The transmitting periphery device is used to transmit a first output frame to the transceiving device. Thus the first output frame is sent to the converting device through the wireless local area network.

Fourth, the receiving periphery device is used to receive the signal from the converting device.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

When the data acquired by the periphery device is to be transmitted to the Internet, in order to avoid the coupling between the periphery device and the computer, i.e. to direct couple the periphery device to the Internet. The present invention provides the periphery devices using a wireless network system according to the preferred embodiment of the present invention, thus the periphery devices can direct transmits the frame through the network server to the Internet. So the independent periphery device in the wireless local area network can connect the remote computer without the resident computer, and the application of all the periphery devices utilizing the Internet can be carried out independently.

Figure 1A:
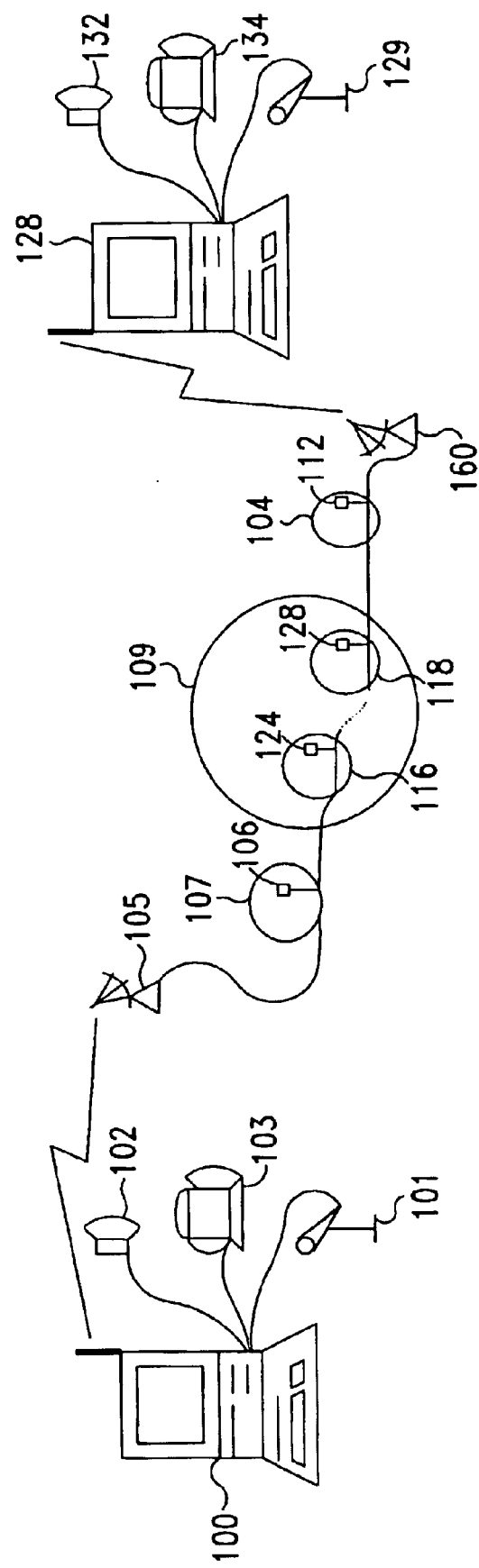
FIG. 1A illustrates the architecture of the wireless local area network and the periphery device in the prior art.
Figure 1B:
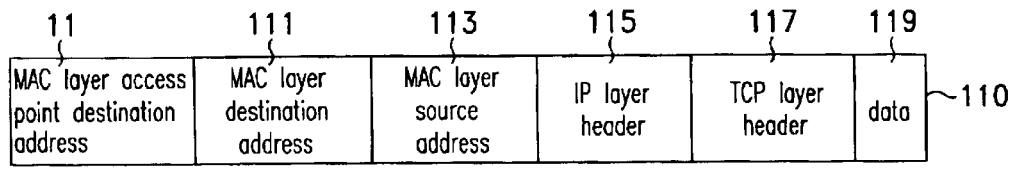
FIG. 1B illustrates the structure of the frame transmitted from the periphery device in the prior art to the access point of the wireless local area network.
Figure 1C:
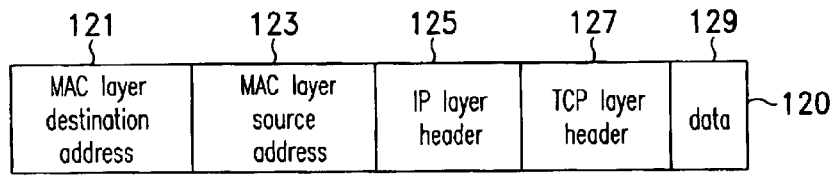
FIG. 1C illustrates the structure of the frame transmitted from the access point of the wireless local area network to the Internet according to the prior art.
Figure 1D:
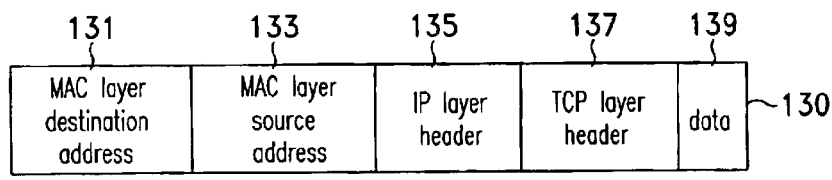
FIG. 1D illustrates the structure of the frame transmitted from the Internet to the access point of the wireless local area network according to the prior art.
Figure 1E:
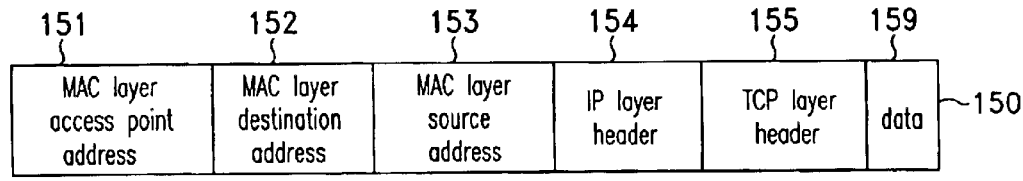
FIG. 1E illustrates the structure of the frame transmitted from the access point of the wireless local area network to the periphery device in the prior art.
Figure 1F:
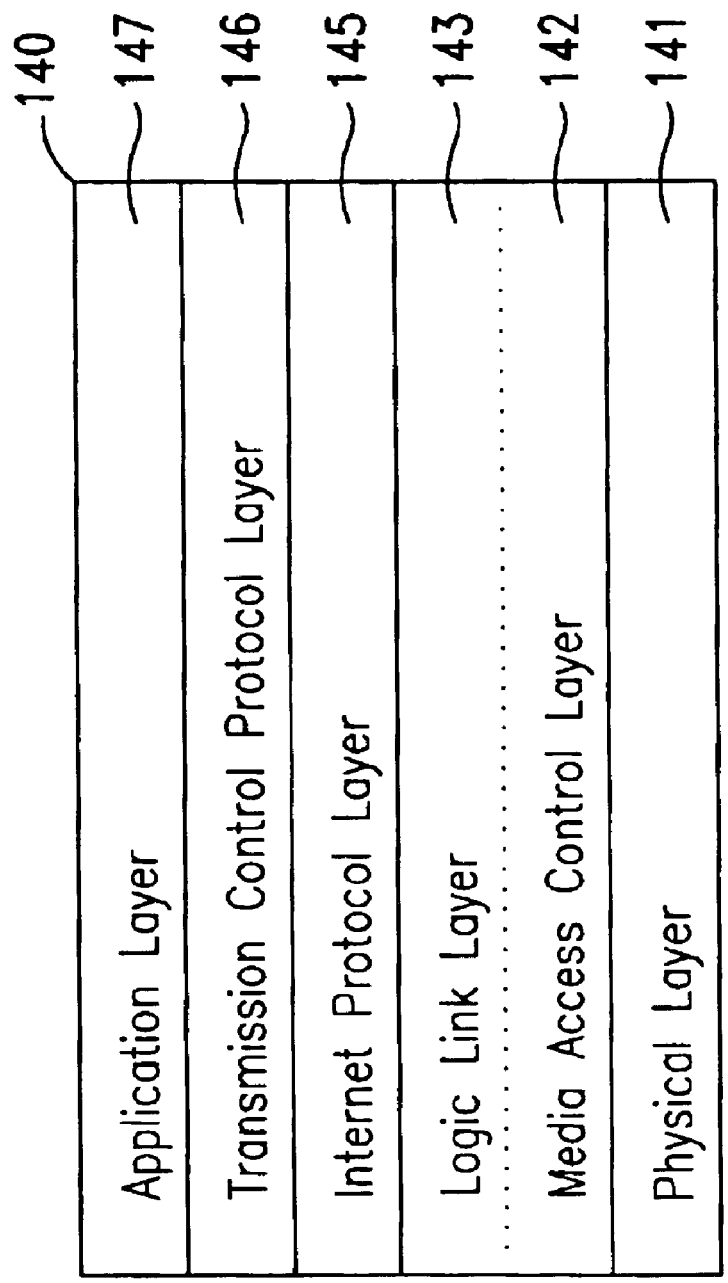
FIG. 1F illustrates the structure of the TCP/IP (Transfer Control Protocol/Internet Protocol datagram) model that used to define the data communication.
Figure 2:
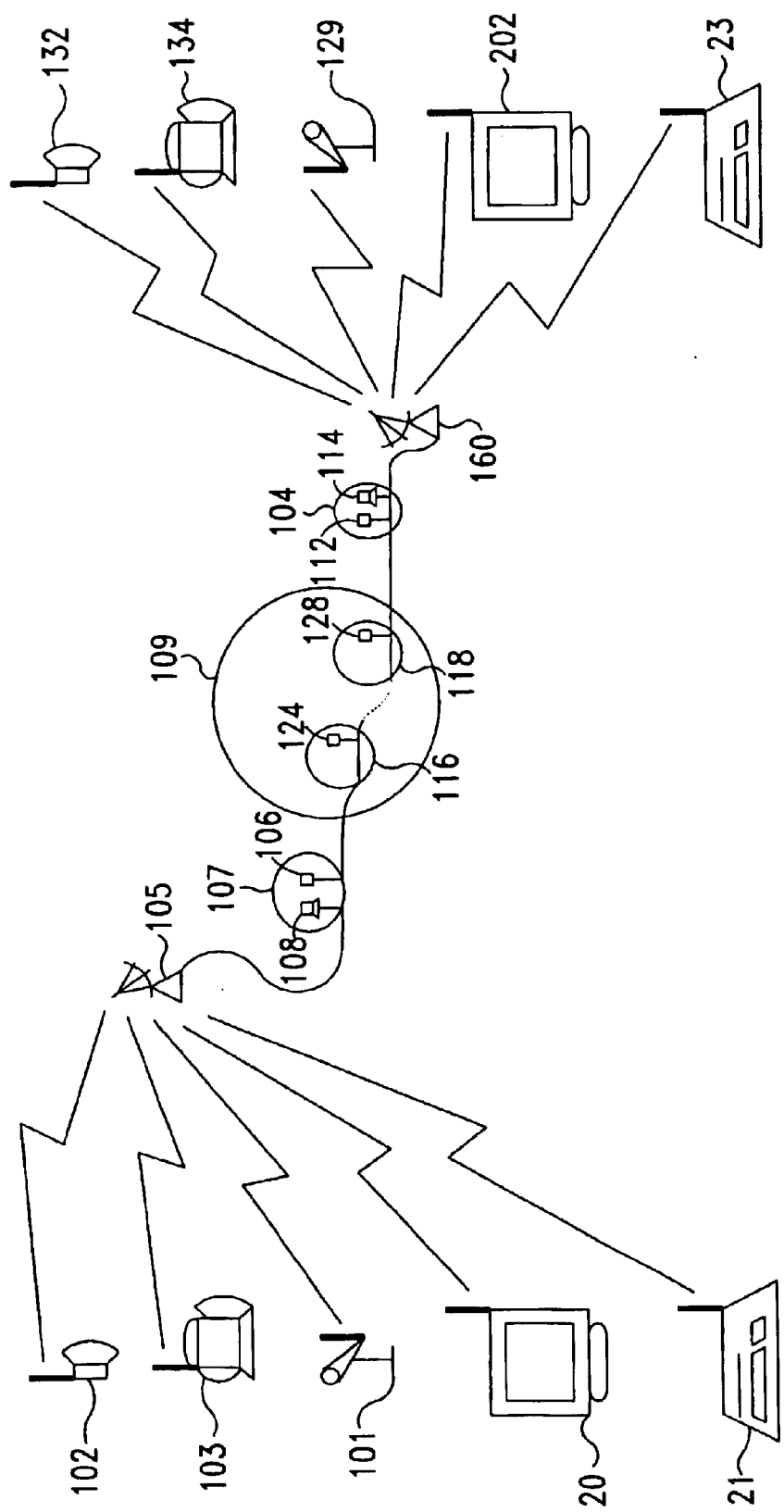
FIG. 2 illustrates the application of the periphery in the present invention of the wireless local area network coupled with the Internet.

The architecture of the wireless network system according to the present invention is illustrated in FIG. 2, in which the local area network 107, the Internet 109 and the local area network 104 are the same as that of the prior art shown in FIG. 1A. Whereas, instead of connecting to the resident computer, the periphery device in the wireless local area network according to the present invention couples to the server 108 of the local area network 107 through the access point 105. In addition, through the Internet 109 and the local area network 104, the periphery device can communicate with the periphery devices connecting to the access point 160. So the various applications can be performed by the communication of the resident periphery devices and the remote periphery devices. It is obvious that the wireless local area network in the present invention enables the connection of the periphery devices to the network server, so it is very convenient to utilize the periphery devices using a wireless local area network to perform the application using the Internet.

In the wireless local area network according to the present invention, a plurality of identical periphery devices can be supplied, in addition, various kinds of periphery devices can be used to implement various kinds of application. For example, the microphone 101 and the speaker 102 in the local area network 107 communicating with the microphone 129 and speaker 132 in the local area network 104 is used as a Internet phone. If the camera 103 in the local area network 107 transmits the video signal to the monitor 202 in the local area network 104, the application mentioned above is a remote monitor. If the microphone in the local area network 107 transmits the voice signal to the speaker 132 in the local area network 104, this is a remote broadcasting system. Because the periphery devices in the wireless local area network in the present invention is wireless coupled to the network server independently, so it is convenient to implement various kinds of functions.

In order to transmit the signal from the periphery device to the network server directly, the format of the signal from the periphery device must be change to the format that the network server can receive and identify. So the output signal of the periphery device of the present invention must be a digital format that has the MAC layer address header. Thus the frame transmitted by the periphery device can be sent to the network server 108. To implement the principle mentioned above in hardware, the hardware that performs the bottom two layers of the TCP/IP five layer structure, i.e. the physical layer and the media access control layer, must be integrated in the circuit of the periphery device respectively. So the output signal of the periphery devices can fit the required format of the network server.

Figure 3A:
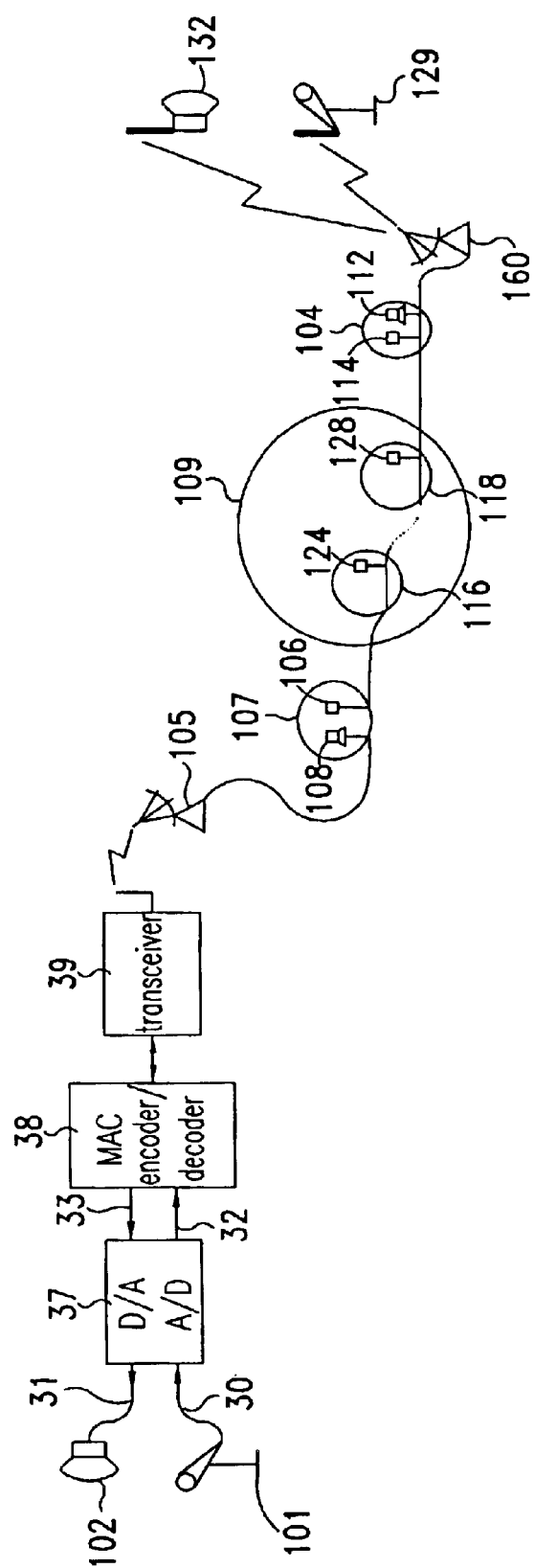
FIG. 3A illustrates the structure of the wireless local area network and the periphery device in the preferred embodiment of the present invention.
Figure 3B:
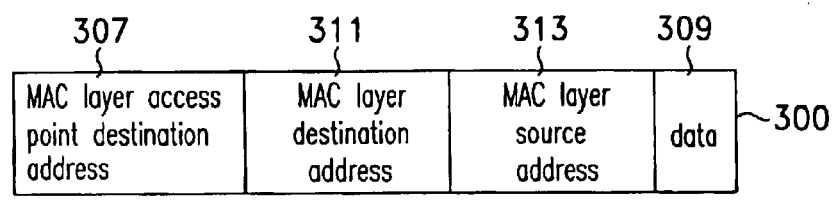
FIG. 3B illustrates the structure of the frame transmitted from the periphery device in the present invention to the access point of the wireless local area network.
Figure 3C:
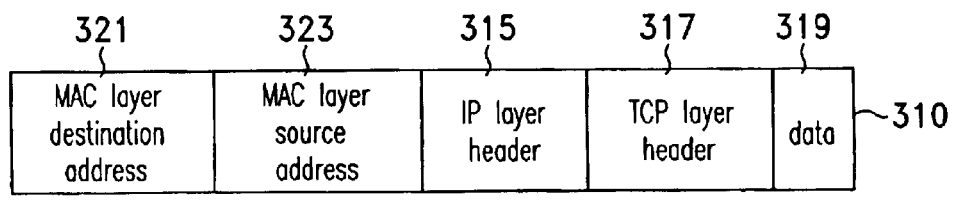
FIG. 3C illustrates the structure of the frame transmitted from the network server of the wireless local area network to the Internet according to the preferred embodiment of the present invention.

In order to illustrate how the periphery device processes the signal, the Internet phone is described for example, the functional block of the Internet phone is shown in FIG. 3A. When the microphone 101 send a signal to the network server 108, the input signal is the analog audio signal 30. The analog audio signal 30 is processed by the analog/digital converter 37 to produce the first digital signal 32. Then the MAC encoder/decoder 38 adds the media access control layer header, such as MAC layer destination address 311 and MAC layer source address 313 in FIG. 3B, to the first digital signal 32. Thus the frame is formed as shown in FIG. 3B, and the format can be accepted and identified for the network server 108. Next, the transceiver 39 transmits the frame 300 by radio wave. The MAC layer destination address 311 is the address of the server that receives the frame 300, in the preferred embodiment of the present invention, the MAC layer destination address 311 is the MAC layer address of the network server 108. The MAC layer source address 313 is the MAC layer address of the periphery device that transmitting the frame 300, in the preferred embodiment of the present invention, the MAC layer source address 313 is the MAC layer address of the microphone 101. The MAC layer access point destination address 307 is the hardware address of the wireless network card of the access point 105. The access point 105 couples the network server and the wireless local area network.

After the frame 300 is received by the access point 105 of the local area network 107, the wireless network card of the access point 105 removes the MAC layer access point destination address 307 of the frame 300, and transmits the other headers and data of frame 300. So the structure of the frame transmitted by the access point 105 is not shown. Through the TCP/IP five layers, the network server 108 converts the frame processed by access point 105 to the formal shown as frame 310, thus the frame can be transmitted in the network. In the network server 108, the MAC layer destination address 311 is replaced with the MAC layer destination address 321, i.e. the address of the gateway 310 that receiving the frame 310, in the preferred embodiment of the present invention, the gateway 106 (FIG. 2) receives the frame 310.

The MAC layer source address 313 is replaced with the MAC layer source address 323, i.e., address of the network server that receiving the frame 310. In the preferred embodiment of the present invention, the hardware address of the network server 108 is the address of the network server that receiving the frame 310. Besides, the data 319 in the frame 310 is the data 309 in the frame 300 being processed by the network server 108. The purpose of the TCP layer header 317 and the IP layer header 316 is the same as the TCP layer header 117 and the IP layer header 115 respectively. And is to ensure the data can arrive the destination network server, which is network server 114 in the preferred embodiment of the present invention.

Figure 3D:
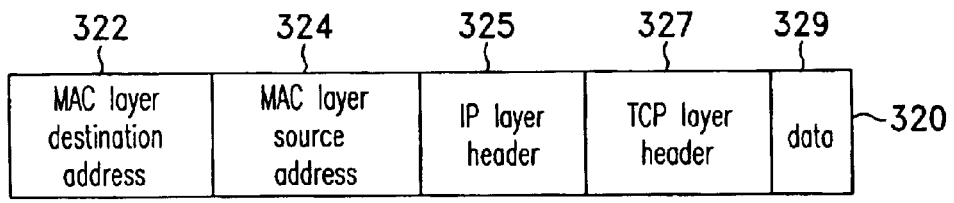
FIG. 3D illustrates the structure of the frame transmitted from the Internet to the network server of the wireless local area network according to the preferred embodiment of the present invention.

When the frame transmitted from the Internet is received by the network server 108, the structure of the frame that transmitted to the local area network 107 is shown as frame 320 in FIG. 3D. In which the data 329 is the microphone 129's output signal that been digitized and processed by the application program of the network server. In addition, the purpose of the TCP layer header 327 and the IP layer header 325 is the same as that of the TCP layer header 117 and the IP layer header 115 respectively. And is to ensure the data can arrive at the destination network server, which is network server 108 in the preferred embodiment of the present invention. The MAC layer destination address 321 is the MAC layer address of the network server that receiving the frame 320, i.e., the hardware address of the network card of the network server 108. The MAC layer source address 324 is the MAC layer address of the gateway that transmitting frame 320. In the preferred embodiment of the present invention, the address of the MAC layer source address 324 is the hardware address of the gateway 106's network card.

During the network server 108 transmits the frame 320 to the periphery device, the application program processes the data 329 to generate the first row data, i.e., the data 339. Besides, the MAC layer destination address 322 is substituted with the MAC layer destination address 311, i.e., the MAC layer address of the periphery device that receiving the frame 330. In the preferred embodiment of the present invention, the MAC layer destination address 322 is the address of the periphery device 102. The MAC layer source address 324 is substituted with the MAC layer source address 333, i.e., the address of the network server 108 that transmitting the frame 330. The MAC layer source address 324 is the hardware address the network server 108's network card in the preferred embodiment of the present invention.

Figure 3E:
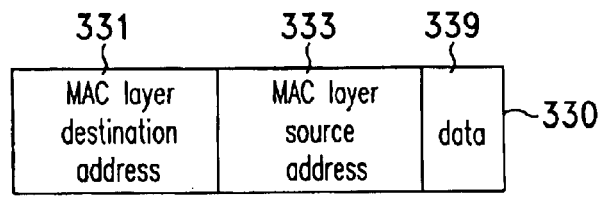
FIG. 3E illustrates the structure of the frame transmitted from the network server of the wireless local area network to the access point of the wireless local area network according to the preferred embodiment of the present invention.
Figure 3F:
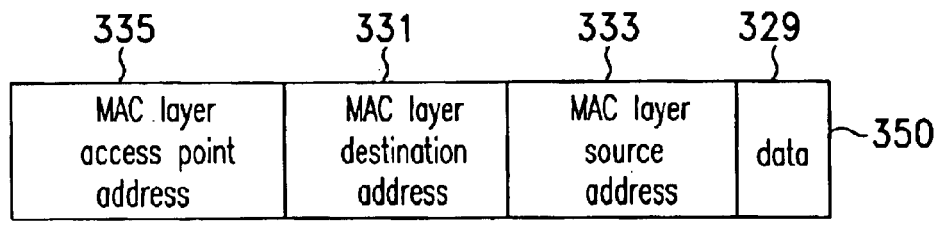
FIG. 3F illustrates the structure of the frame transmitted from the access point of the wireless local area network to the periphery device according to the preferred embodiment of the present invention.

The access point 105 builds up a table for the computer communicating with the access point 105 shown in FIG. 2. Even the MAC layer destination address 333 (FIG. 3E) is not the access point 105's MAC layer address, the access point 105 will receive the frame when the MAC layer destination address in the frame is the same as the periphery device's address. In addition, a MAC layer access point address 335 is added to the frame mentioned above, and the frame being added with the MAC layer access point address 335 is shown as frame 350 in FIG. 3F.

The circuitry of the wireless periphery devices according to the preferred embodiment of the present invention can be the circuitry of the traditional wireless periphery device together with a circuitry for implementing function of the lower two layers of the TCP/IP five layers.

Figure 4:
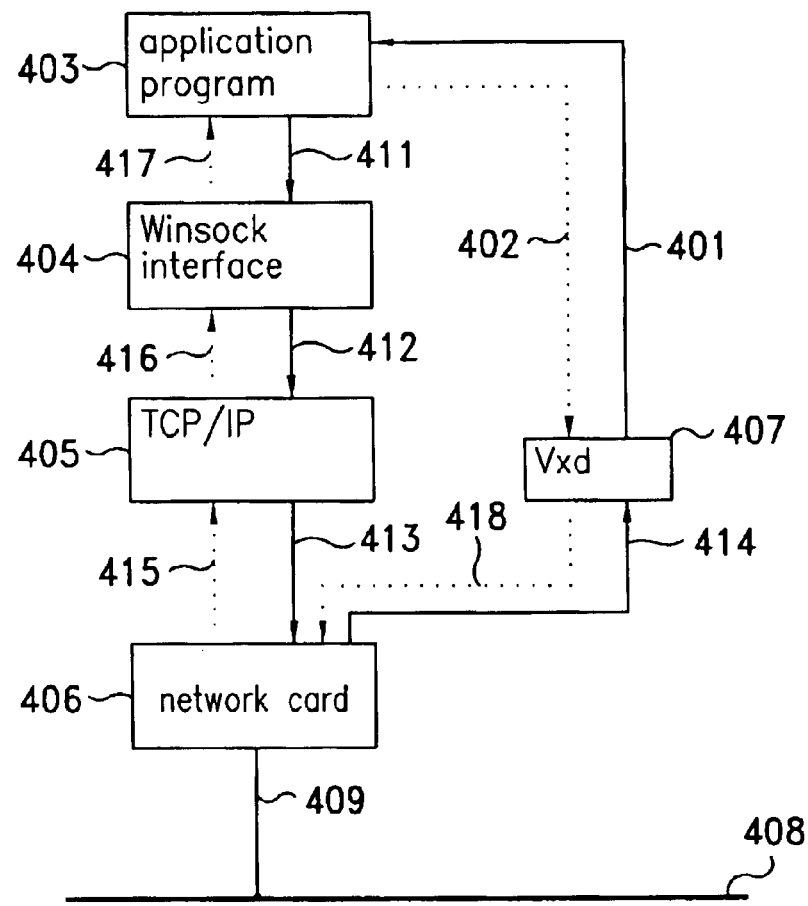
FIG. 4 illustrates the device that used to detect the header of frame and the path that the frame passes in the preferred embodiment of the present invention.

In the other respect, when the access point using the present invention transmits the frame to the to the network server, the path that the frame passing through is the solid line in the FIG. 4. In which the frame is transmitted from solid line 409 and subsequently passes the solid line 414, 401, 411, 412, 413, then return to solid line 409. The network card 408 takes the input frame, then the application program 403 take the input frame through Vxd 407, in which the Vxd 407 is the abbreviation of virtual device driver, and is a kind of program in the operation system level that widely used in the prior art to manage the input/output device. The application program 403 processes the MAC header of the input frame, and acquires the information of the IP header relating to the forgoing MAC header. In addition, the application program 403 proceeds with the row data in the input frame to acquire a processed data. Then the Winsock interface 404 transmits the processed data and the information of the IP header to the TCP/IP 405, then generates a datagram including the TCP header and the IP header. Next, the datagram is added with a MAC header by the network card 406, and then is sent to the network 408 and to the network server finally.

In the other aspect, when the network server transmits the frame to the access point using the present invention, the path that the frame passing through is the dashed line in the FIG. 4. In which the frame is transmitted from solid line 409 and subsequently passes the dashed line 416, 418, 417, 402, 418, then return to solid line 409. The IP header of the frame transmitted to the access point is replaced with the other MAC header that enables the frame propagating to the transceiver of the periphery device. In transmitting the frame from the network server to the access point, because the function of the elements shown in FIG. 4 is the same as that of transmitting the frame from the access point to the network server. So the function of the elements is not detailed herein.

In processing the TCP/IP frame, the traditional operation system core includes the functional blocks 403, 404, 405, and 406. The frame is transmitted between the functional blocks 403, 404, 405, and 406 in the order 409, 415, 416, 417, 411, 412, 413, and then return to 409 again. The network 408 in FIG. 4 can be an Ethernet, and the Vxd 407 is used to manage the input/output device in the prior art. In the preferred embodiment of the present invention, the Vxd 407 is used to enable the communication between the application program and the network 408, thus the header according to the preferred embodiment of the present invention can be added to the frame. The Vxd is the abbreviation of virtual device driver, and is a kind of program in the operation system core widely used in the prior art to manage the input/output device. In addition, the access point in the preferred embodiment of the present invention is a converting device in functionality and is a bridge of the wireless local area network and a local area network coupling to the Internet.

As will be understood by persons skilled in the art, the foregoing preferred embodiment of the present invention is illustrative of the present invention rather than limiting the present invention. Having described the invention in connection with a preferred embodiment, for example, if the various periphery device or the different protocol are used in the preferred embodiment. As long as the computer coupling the periphery device and the access point of the wireless local area network is spared, the modification will now suggest itself to those skilled in the art. While the preferred embodiment of the invention has been illustrated and described, it will be appreciated that various changes can be made therein without departing from the spirit and scope of the invention.

What is claimed is:

1. Apparatus for transmitting a signal from periphery means to an Internet through a wireless local area network, said apparatus comprising:

converting means for processing a MAC (Media Access Control) layer header of said signal and adding a TCP/IP (Transmission Control Protocol/Internet protocol) layer header to said signal, thus said signal being transmitted to said Internet, said converting means processing said MAC layer header of said signal and removing said TCP/IP layer header from said signal, thus said signal is transmitted to said periphery means;

transceiving means for transmitting/receiving said signal to/from said converting means through said wireless local area network;

first periphery means for transmitting a first output frame to said transceiving means, said first periphery device converting an input signal to a digital signal, and then adding MAC layer header to said digital signal to form said first output frame, thus a MAC layer address of a first periphery means and said MAC layer address of a converting means be included in said MAC layer header; and second periphery means for receiving said signal from said transceiving means.

2. The apparatus as claim 1, wherein said converting means comprises First MAC header processing means and a network card, said signal from said Internet to said periphery device being removed of said TCP/IP layer header, and firstly passes said network card then passes said First MAC header processing means, said signal from said periphery device to said Internet being added with said TCP/IP layer header, and firstly pass said First MAC header processing means then passes said network card.

3. The apparatus as claim 2, wherein said First MAC header processing means is a virtual device driver (Vxd) that belongs to a level of a core of an operation system.

4. The apparatus as claim 1, wherein said transceiving means is a bridge of said wireless local area network and a local area network coupling to said Internet.

5. The apparatus as claim 1, wherein said first periphery means comprises an analog to digital converter, a MAC layer encoder/decoder, and a transmitter.

6. The apparatus as claim 5, wherein said analog to digital converter converts said input signal to said digital signal.

7. The apparatus as claim 5, wherein said MAC layer encoder/decoder adds said MAC layer header to said digital signal.

8. The apparatus as claim 5, wherein said transmitter sends an output signal of said MAC layer encoder/decoder to said transceiving means through said wireless local area network.

9. The apparatus as claim 1, wherein said second periphery means comprises a digital to analog converter, a MAC layer encoder/decoder, and a receiver.

10. The apparatus as claim 9, wherein said receiver receives from said transceiving means to convert to an electrical signal and then sends to said MAC layer encoder/decoder, said electrical signal comprises a second MAC header and a digital format signal.

11. The apparatus as claim 9, wherein said MAC layer encoder/decoder removes said second MAC header from said electrical signal, said second MAC header comprises said MAC layer address of said second periphery means and said MAC layer address of said converting means.

12. The apparatus as claim 9, wherein said digital to analog converter converts said digital format signal to an analog format signal.

13. Apparatus for transmitting a signal from periphery means to an Internet through a wireless local area network, said apparatus comprising:
   converting means for processing a MAC (Media Access Control) layer header of said signal and adding a TCP/IP (Transmission Control Protocol/Internet protocol) layer header to said signal, thus said signal being transmitted to said Internet, said converting means processing said MAC layer header of said signal and remove said TCP/IP layer header from said signal, thus said signal is transmitted to said periphery means, said converting means comprising First MAC header processing means and a network card, said signal from said Internet to said periphery device being removed of said TCP/IP layer header, and firstly passes said network card then passes said First MAC header processing means, said signal from said periphery device to said Internet being added with said TCP/IP layer header, and firstly passes said First MAC header processing means then passes said network card, said First MAC header processing means being a virtual device driver (Vxd) that belongs to a level of a core of an operation system;

transceiving means for transmitting/receiving said signal to/from said converting means through said wireless local area network, said transceiving means being a bridge of said wireless local area network and a local area network coupling to said Internet;

first periphery means for transmitting a first output frame to said transceiving means, said first periphery device converting an input signal to a digital signal, and then adding a MAC layer header to said digital signal to form said first output frame, thus a MAC layer address of a first periphery means and said MAC layer address of a converting means be included in said MAC layer header; and second periphery means for receiving said signal from said converting means.

14. The apparatus as claim 13, wherein said first periphery means comprises an analog to digital converter, a MAC layer encoder/decoder, and a transmitter.

15. The apparatus as claim 14, wherein said analog to digital converter converts said input signal to said digital signal.

16. The apparatus as claim 14, wherein said MAC layer encoder/decoder adds said MAC layer header to said digital signal.

17. The apparatus as claim 14, wherein said transmitter sends an output signal of said MAC layer encoder/decoder to said transceiving means through said wireless local area network.

18. The apparatus as claim 13, wherein said second periphery means comprises a digital to analog converter, a MAC layer encoder/decoder, and a receiver.

19. The apparatus as claim 18, wherein said receiver receives from said transceiving means to convert to an electrical signal and then sends to said MAC layer encoder/decoder, said electrical signal comprises a second MAC header and a digital format signal.

20. The apparatus as claim 18, wherein said MAC layer encoder/decoder removes said second MAC header from said electrical signal, and second MAC header comprises said MAC layer address of said second periphery means and said MAC layer address of said converting means.

21. The apparatus as claim 18, wherein said digital to analog converter converts said digital format signal to an analog format signal.

* * * * *